United States Patent
Engle et al.

(10) Patent No.: US 10,800,680 B2
(45) Date of Patent: Oct. 13, 2020

(54) METHOD FOR ELECTROMAGNETIC FLUID TREATMENT UTILIZING FREQUENCIES AND HARMONICS

(71) Applicants: Jon A. Engle, Murfreesboro, TN (US); Alexander J. Garrison, Fairview, TN (US)

(72) Inventors: Jon A. Engle, Murfreesboro, TN (US); Alexander J. Garrison, Fairview, TN (US)

(*) Notice: Subject to any disclaimer, the term of this patent is extended or adjusted under 35 U.S.C. 154(b) by 168 days.

(21) Appl. No.: 16/174,281

(22) Filed: Oct. 30, 2018

(65) Prior Publication Data

US 2019/0152812 A1    May 23, 2019

Related U.S. Application Data

(60) Provisional application No. 62/578,736, filed on Oct. 30, 2017.

(51) Int. Cl.
*C02F 1/78* (2006.01)
*C02F 1/48* (2006.01)
*C02F 5/00* (2006.01)

(52) U.S. Cl.
CPC ............ *C02F 1/487* (2013.01); *C02F 1/78* (2013.01); *C02F 5/00* (2013.01); *C02F 2201/486* (2013.01); *C02F 2303/22* (2013.01)

(58) Field of Classification Search
CPC .... C02F 1/487; C02F 1/78; C02F 1/48; C02F 5/00; C02F 2201/486; C02F 2303/22
USPC ...................................................... 23/293 R
See application file for complete search history.

(56) References Cited

U.S. PATENT DOCUMENTS

| | | | |
|---|---|---|---|
| 5,113,751 A | 5/1992 | Holcomb | |
| 5,173,169 A | 12/1992 | Garrison | |
| 5,306,887 A | 4/1994 | Smith | |
| 5,326,446 A | 7/1994 | Binger | |
| 6,139,717 A | 10/2000 | Hayakawa | |
| 6,324,974 B1 | 12/2001 | Pomeroy | |
| 7,018,546 B2 | 3/2006 | Kurihara | |
| 7,351,341 B2 | 4/2008 | Tsuboi | |
| 2005/0121396 A1 | 6/2005 | Kosakewich | |
| 2009/0242407 A1 | 10/2009 | Shiga | |

FOREIGN PATENT DOCUMENTS

| | | |
|---|---|---|
| CN | 101381131 A | 3/2009 |
| CN | 201321397 U | 10/2009 |
| CN | 201325899 U | 10/2009 |
| CN | 201442878 U | 4/2010 |
| CN | 101353193 B2 | 9/2011 |
| CN | 101381130 B | 5/2013 |
| EP | 1676815 A1 | 7/2006 |
| WO | WO1992009857 A1 | 6/1992 |

OTHER PUBLICATIONS

Mercier, et al., Biofouling, 2016, pp. 287-299, vol. 32, Issue 3,Taylor & Francis Group Ltd., 2 Park Square Oxford OX14 4RN United Kingdom.

*Primary Examiner* — Edward M Johnson

(57) ABSTRACT

A method and system for utilizing electromagnetic energy of a frequency, and/or multiple frequencies, and higher harmonics of those frequencies to disrupt the normal bonding of the fluid molecules and that of mineral structures within the body of the fluid is disclosed. Electromagnetic signals at a frequency, frequencies, and higher harmonics related to the energy absorption/emission profile of the fluid being treated are directed into the fluid through direct or indirect injection and/or induced coupling. The frequency, frequencies, and higher harmonics of the treatment signal, preferably between 0.1 KHz and 1000 MHz, may be changed if the absorption/emission profile of the fluid changes during treatment.

12 Claims, 6 Drawing Sheets

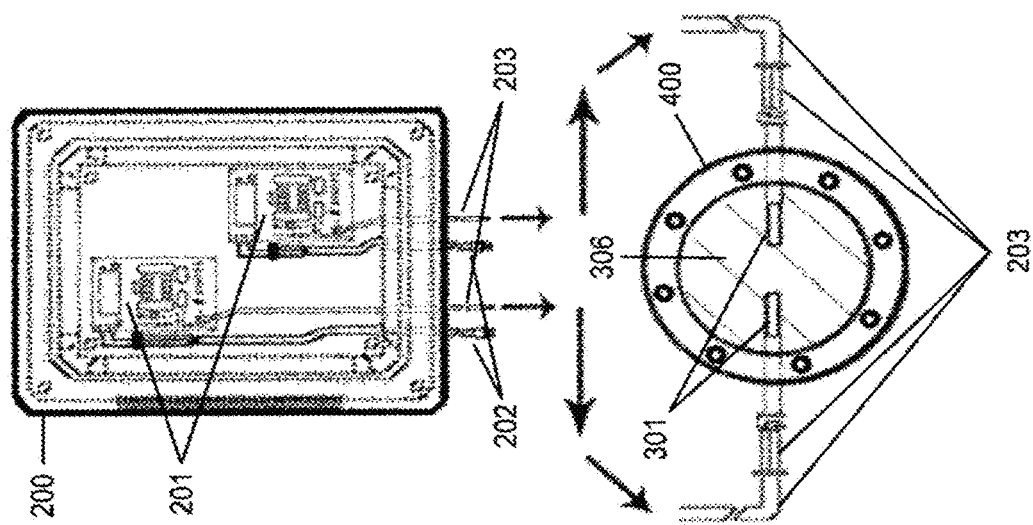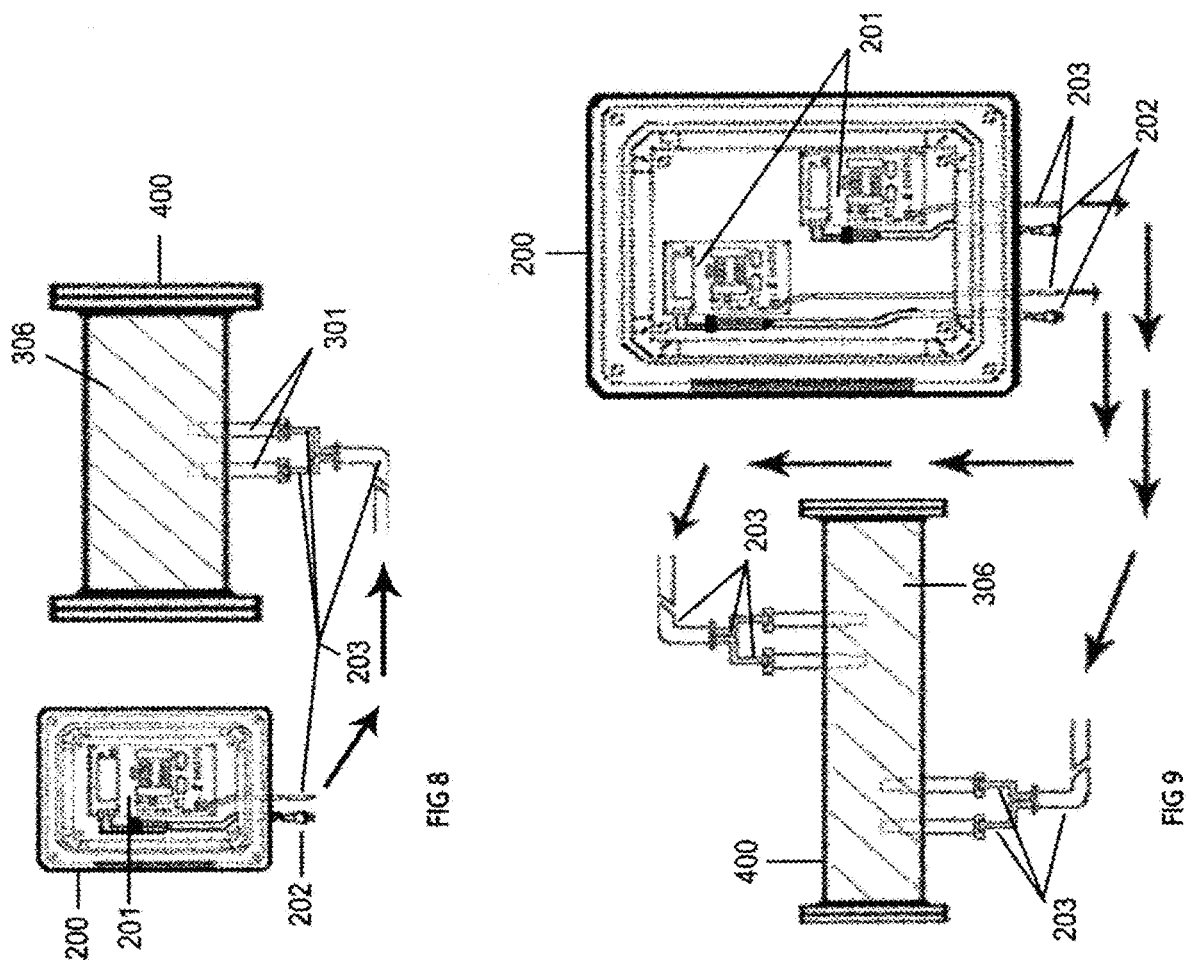

METHOD FOR ELECTROMAGNETIC FLUID TREATMENT UTILIZING FREQUENCIES AND HARMONICS

BACKGROUND

This invention relates generally to the treatment of fluid for the purpose of enhancement of the fluid properties. More particularly, the invention provides a treatment method whereby a fluid is treated by an electromagnetic signal, the frequency and/or frequencies, with associated higher harmonics thereof has been determined to provide optimal absorption and/or emission of energy by the particular atomic and molecular matter present in the fluid or to be added to the fluid.

Research has led to the development of a Quantum ElectroDynamics ("QED") system of injecting "RF" (Radio Frequency) energy directly and indirectly into the fluid being treated. The "QED'" s design is based upon the established scientific principle that each molecule will absorb maximum energy at its own resonant frequency. The full photon energy of the "E" and "H" field vectors of the "RF" signal is used by actually touching the fluid. The Faraday Effect (induced coupling) is also present using the present invention "QED" injection system. The present invention uses direct and/or indirect injection of photon energy with "RF" and the Faraday Effect.

The "QED" generates a large electrical field and smaller magnetic field vectors at the emission/absorption profile frequencies and theharmonics of the atoms of the fluid molecules. The injection of "RF" energy disrupts the normal bonding of the fluid molecules and that of critical mineral structures within the body of the fluid. When certain atoms of the fluid molecules absorb a photon of energy from the "QED" the atoms go into an unnatural higher energy level. This photon of energy is now available to be absorbed by any critical mineral structures such as calcium, magnesium, silica or any other mineral that might form within the treated fluid. This energized fluid allows much higher levels of concentration and solubility of minerals or other substances.

The invention is generally applicable to applications wherein altering the evaporation rate of a fluid or substance is desired. The invention is further applicable to applications wherein altering the surface tension and/or capillary action of a fluid or substance is desired. The invention is particularly applicable wherein altering the solubility of a substance, whether solid, liquid, or gas, into a fluid or substance is desired. It must be appreciated, however, that the invention has broader utility and may be used in a variety of applications including virtually any application wherein electromagnetic energy is used to bring about a change in biological/chemical oxygen demand; to alter the ionization or reactivity of other elements including but certainly not limited to copper, gold, carbon and platinum; to alter the electromechanical characteristics of water or other fluids; or to control the solubility of various substances within water or fluids.

In general, the methods and devices of the prior art utilize electromagnetic energy to bring about various effects on atomic or molecular matter contained in a solution or suspension. One of the purported advantages of many such prior art electromagnetic devices is that they eliminate or reduce the need for the addition of chemical treatment agents. However, many of the prior art methods and devices have proven to be only minimally or sporadically effective in certain applications. Additionally, the prior art devices and methods are, in many cases, confounded by technical complexity making such devices and methods expensive to manufacture and difficult to install.

A shortcoming in the known prior art is the lack of quantifiable examples regarding the use of electromagnetic energy in the treatment of fluid incorporating higher harmonics. Further, the use of higher harmonics in conjunction with a frequency or multiple frequencies in the field of electromagnetic energy to perform known and unknown applications of said energy is in contrast to common practice. As a general rule in dealing with radio frequencies, jitter and higher harmonics are undesirable and therefore are limited or completely eliminated.

BRIEF SUMMARY OF THE INVENTION

The mechanism by which the present invention functions is at least partially explainable on the basis of the theory of quantum electrodynamics. In general, quantum electrodynamic theory speaks to the manner in which electromagnetic fields interact with atoms and molecules, as well as the resultant interactions between molecules. The theory of quantum electrodynamics is, in part, based on the relation between the energy of a quantum of light, the photon, and the frequency of any electromagnetic field corresponding to it. In applying quantum electrodynamics to the present invention, it must be recognized that dynamic electromagnetic fields are known to interact with the various charged particles which form constituents of atoms and molecules (i.e. electrons). As a result, the external application of an electromagnetic field will bring about various disruptions of the internal fields which are responsible for the particular atomic or molecular structure and the interrelationships of the charged particles therein. Thus, depending upon the atomic or molecular matter present, the energy absorption/emission characteristics of a solution will vary as the frequency of the external electromagnetic field is varied. By setting the frequency of an externally applied electromagnetic signal to maintain a specifically desired level of absorption or emission within a solution or suspension, the intended effects of the electromagnetic field may be optimized. As such, the jitter and higher harmonics of the desired frequency are generally viewed as undesirable and are typically limited to reduce harmonic distortion of the applied signal.

In electronics, Jitter is the deviation from the true periodicity of a periodic signal. Periodic functions are used throughout sciende to describe oscillations, waves, and other phenomena that exhibit periodicity. Jitter is a significant, and usually undesired, factor in the design of almost all communications. A Harmonic is typically applied to repeating signals, such as sinusoidal waves. A harmonic of such a wave is a wave with a frequency that is a positive integer multiple of the frequency of the original wave, known as the fundamental frequency. The original wave is also called the 1st harmonic, the following harmonics are known as higher harmonics. Higher harmonics contribute to distortion and are generally considered undesirable.

The known prior art is replete with electromagnetic water treatment methods and devices. Many such methods and devices employ electromagnetic energy of static fixed frequency. Several other known prior art disclose specific methods and/or devices which employ varied and/or mixed frequency. These include methods and/or devices utilizing "sweep-frequency", which could also be considered a pulse or oscillating frequency. These multiple and/or oscillating frequencies are being discussed as a target signal and a second individual signal being labeled as a harmonic signal.

Those skilled in the art will appreciate that electromagnetic frequencies and the Faraday Effect require impedance matching for the chosen carrier signal. Utilization of these "sweep-frequency" or oscillating frequency would not work well except at those limited frequencies with proper impedance matching. The ability to transfer necessary photons of energy through improper impendence would severely limit the functionality of the methods and/or devices. In addition, these methods and/or devices inevitably restrict or eliminate the higher harmonics of the utilized frequencies.

The known prior art disclosing varied and/or mixed frequency as well as the "sweep-frequency" methods and/or devices, utilize a fundamental frequency and a "second" harmonic frequency in terms of two or more frequencies without the higher harmonics of those frequencies. Even in the case where an integral multiple harmonic frequency is selected, it is generated and included as a new separate non-higher harmonic signal which could be used in combination with or "instead of" the corresponding fundamental frequency. The use of the term "instead of" in the prior art indicates its intent to utilize all signals as individual fundamental frequencies and not as higher harmonic signals.

The present invention overcomes shortcomings in prior art and inventions by providing a versatile and relatively simple method and system for employing electromagnetic energy of a frequency and/or multiple frequencies, including higher harmonics to treat various fluids. More fundamentally, the present invention seeks to utilize a frequency or multiple frequencies combined with higher harmonics to transcend the theory of quantum electrodynamics. The higher harmonics are included in the output signal as a "dirty" or "impaired" fundamental signal and not as a newly selected and introduced signal. Additional frequencies may be included with or without the higher harmonics of those frequencies. The present invention also takes advantage of controlled jitter corresponding to the fundamental frequency. The combination of a frequency or multiple frequencies and the higher harmonics provide a greater disruption of the normal bonding of the fluid molecules and that of critical mineral structures within the body of the fluid than achievable by a single static and/or mixed and/or oscillating frequency at the absorption/emission profile of the fluid being treated.

Accordingly, a principal object of the present invention is to provide a method and system for treating fluid with electromagnetic vectors, the frequency, frequencies, and higher harmonics of which have been determined to correspond with a desired level of absorption or emission of energy by the particular atomic and/or molecular matter contained in or to be added to the fluid. In most cases, the desired treatment frequency, frequencies, and higher harmonics will be the signal at which maximum current absorption is observed.

It is a further object of the present invention to provide a method for optimizing the efficacy of various electromagnetic fluid treatment devices by providing a method for operating such devices at a frequency, frequencies, and higher harmonics which have been specifically determined to provide optimal absorption or emission of energy by the particular atomic and molecular matter contained within the fluid(s) being treated. The signals may be generated by any type of electromagnetic frequency generator capable of generating signals within the effective frequency ranges and without hindrance to the associated higher harmonics. A broad range (e.g. 0.1 KHz to $10^3$ MHz) is sufficient for water containing systems in general. Signal generators having narrower frequency ranges such as 0.1 kHz-100 MHz or 0.1 KHz-500 MHz may, of course, be employed depending upon solute content of the liquid and the spedlic application. involved.

The determination of a fluids optimal absorption or emission of energy begins with reviewing the resonant frequency (s) of the particular atomic and molecular matter contained within the fluid being treated. A resonant frequency is the natural vibrating frequency of an atom and/or molecule. Resonant frequencies of most atoms or molecules are readily available, however, these are estimations based on static lab conditions. Utilization in real world settings requires testing utilizing a spectrum analyzer or similar type device to determine the desired frequencies and associated higher harmonics.

An additional object of the present invention is to provide a convenient method and system for utilizing electromagnetic energy in the form of a frequency, multiple frequencies, and higher harmonics for the purpose of altering the evaporation rate of a fluid or substance.

Another additional object of the present invention is to provide a convenient method and system for utilizing electromagnetic energy in the form of a frequency, multiple frequencies, and higher harmonics for the purpose of altering the surface tension and/or capillary action of a fluid or substance.

A further additional object of the present invention is to provide an electromagnetic fluid treatment method utilizing electromagnetic energy in the form of a frequency, multiple frequencies, and higher harmonics for the purpose of altering the solubility of a substance, whether solid, liquid, or gas, into a fluid or substance.

Yet another additional object of the present invention is to provide a system which may be used in an application where the approximate or effective frequency, multiple frequencies, and higher harmonics for the given desired treatment is known and measuring and adjustments are unnecessary.

Additional objects and advantages of the invention will become apparent to those skilled in the art upon consideration of the accompanying drawings and the detailed description and examples which follow.

DETAILED DESCRIPTION AND BEST MODE OF IMPLEMENTATION

Figure 1:
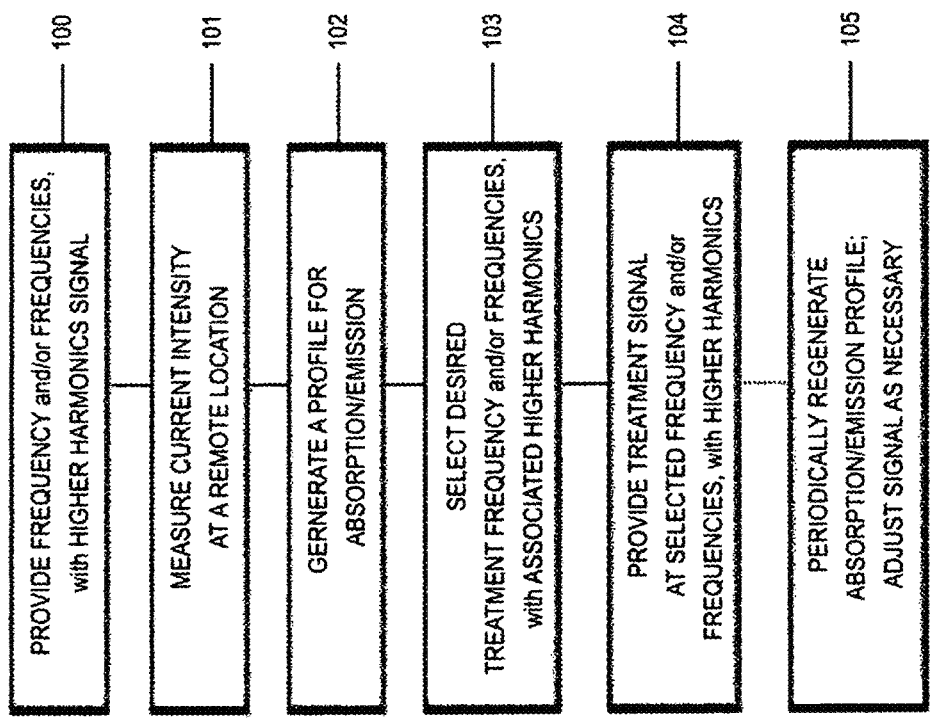
FIG. 1. presents a flow diagram outlining a preferred method of the present invention FIG. 2. illustrates an enclosure of nonspecific size and material FIG. 3. illustrates an RF signal generator placed into an enclosure FIG. 4. illustrates a sealable enclosure of nonspecific size and material FIG. 5. illustrates an RF injector of nonspecific size and conductive material FIG. 6. illustrates a sealable enclosure with RF injectors placed inside FIG. 7. is a diagrammatic representation of a preferred method of the present invention herein described below FIG. 8. is a diagrammatic representation of a preferred method of the present invention herein described below FIG. 9. is a diagrammatic representation of a preferred method of the present invention herein described below FIG. 10. is a continued illustration demonstrating a preferred method of the present invention further illustrating FIG. 9

Referring now to the drawings wherein the showings are for purposes of illustrating preferred embodiments of the invention and not for purposes of limiting the same. The present invention may be used with a closed or open type fluid system. The fluid may originate from any available means such as standard potable water, brackish ground water, river, creek, well, pond, containment reservoir, holding tank or any other desired body of fluid. The fluid may either be flowing or standing.

For the purposes of explanation, a closed water system is generally defined as a system in which fluid may flow or remain standing within an enclosure, such as a pipe, passage, tube or other means of enclosure. The fluid may then exit through any desired means, such as a hose, sprinkler head, valve or any other desired means of evacuating any amount of fluid for its intended use.

For the purposes of explanation, an open water system is generally defined as a system in which fluid may be exposed, remaining either standing, such as a pond, tank or any other desired stationary body of fluid, or flow by any desired means, such as a furrow, ditch, a channel, or any other desired means to deliver fluid. The fluid may then be diverted to any desired location for its intended use.

FIG. 1 outlines a block diagram form of a preferred fluid treatment method of the present invention in which, for purposes of explanation, consists of a water treatment system. The initial step of providing varying frequency, frequencies, and higher harmonic test signals 100 may, depending upon the frequency range desired, be accomplished by a variety of devices capable of generating electromagnetic energy without hindrance to the associated higher harmonics. However, it is typically preferable to utilize a signal generator capable of providing electromagnetic energy within the radiofrequency band to develop a usable absorption/emission profile for most water based systems. The signal generating device can be directly or indirectly connected to the water being treated. The term "absorption/emission" profile as used herein means a visual or recorded summary of the absorption and emission characteristics of the fluid being treated for each of the test signals generated by the generator.

The second step comprising of measuring current intensity at a remote location 101 is accomplished by connecting any appropriately calibrated current measuring device to a point in the system where it will detect the current intensity of the generated signal within the water being treated. The water to be treated should be consistent and non-disrupted between the point at which the test signals are provided 100, i.e. "signal application point", and the remote location at which the current intensity is measured 101, i.e. "current measurement point". Closed valves, large air filled voids or similar within the water could disrupt the signal and can lead to distorted or erroneous current intensity readings. The water between the signal application point and the current measurement point may be either standing or flowing, provided that consistency, i.e. a steady state condition, is maintained.

The determination of a fluids optimal absorption or emission of energy begins with reviewing the resonant frequency (s) of the particular atomic and molecular matter contained within the fluid being treated. A resonant frequency is the natural vibrating frequency of an atom and/or molecule. Resonant frequencies of most atoms or molecules are readily available, however, these are estimations based on static lab conditions. Utilization in real world settings requires testing utilizing a spectrum analyzer or similar type device to determine the desired frequencies and associated higher harmonics.

Any type of device capable of measuring current intensity in the relevant range may be used, although, the preferred embodiment employs a spectrum analyzer whereby the waveform of the signal may be visualized and additional waveform measurements may be made as required. In many cases a simple milliammeter will be an appropriate instrument for measuring current intensity at the remote location 101. The current measured at the remote location will vary as the frequency, frequencies, and higher harmonics of the test signal varies. Such current variations relative to signal frequency, frequencies, and higher harmonics are indicative of absorption or emission of energy by the atomic, molecular species, or critical mineral structures present in the water. Thus, the measured current intensity relative to the corresponding test signal frequency, frequencies, and higher harmonics will generate an absorption/emission profile 102. Such profile, in most cases, will extend over a frequency range of approximately 0.1 KHz to 1000 MHz; however, any applicable frequency range may be employed.

After the absorption/emission profile has been generated, the next step is to select a treatment frequency, frequencies, and higher harmonic signal 103. In most cases it is desirable to select the signal at which maximal absorption of current is observed. Such is referred to as the maximal absorption frequency. It should be appreciated, however, in specific cases it may be desirable to select the observed maximal emission frequency, frequencies, and higher harmonics or any other treatment frequency, frequencies, and higher harmonics necessary for the required application, the selection of which is made on the basis of the previously generated absorption/emission profile.

After selecting the treatment frequency, frequencies, and higher harmonics, an electromagnetic signal generator is set to provide a treatment signal at the selected frequency, frequencies, and higher harmonics 104. Usually, a single signal generator is used to provide the test signals 100 as well as the subsequent treatment signal 104. However, any number of signal generators may be used to accomplish a desired effect.

After the water has been treated for a reasonable period of time, the operator may optionally repeat steps 100 through 102, 105, thereby periodically regenerating absorption/emission profile data. If such newly generated absorption/emission profile data indicates a change in maximal absorption or emission frequency has occurred, the treatment frequency, frequencies, and higher harmonics may be adjusted accordingly.

Figure 2:
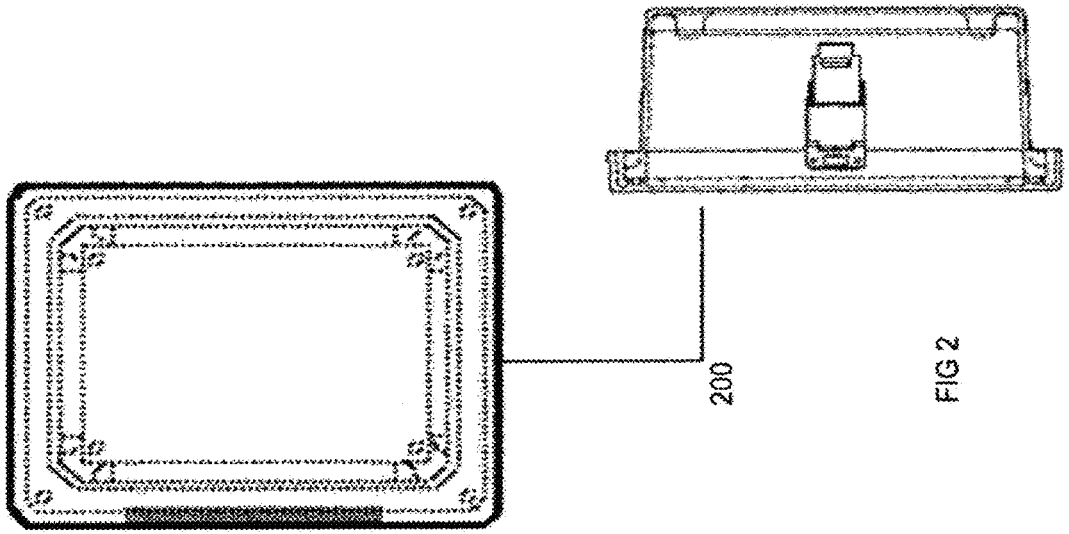

FIG. 2 illustrates a National Electrical Manufacturers Association ("NEMA") type enclosure of non specific size and material 200. The size and material of the NEMA enclosure may vary depending on the desired application of the present invention. For those skilled in the art upon consideration of the accompanying drawings and the detailed description and examples which follow, an enclosure is an obvious and necessary requirement to encase most types of signal generators. The enclosure may act as a type of Faraday cage or shield, which is an enclosure used to block electromagnetic fields.

Figure 3:
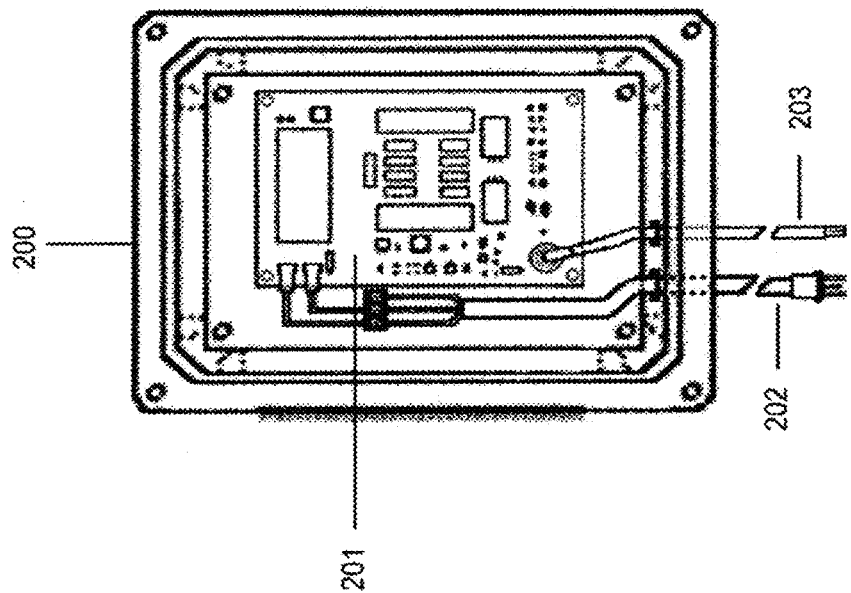

FIG. 3 illustrates an RF signal generator 201 placed inside a NEMA type enclosure 200. Any signal generator may be utilized, but for purposes of explanation, the present inventions signal generator is capable of providing a single frequency, multiple frequencies simultaneously, and including or eliminating the harmonics of those frequencies. The signal generator is typically powered externally 202 with a "3-prong grounded plug" which plugs into a standard 110/120 volt outlet. However, power may be supplied in a number of ways. A signal carrier/transfer wire or cable 203 is attached to the signal generator 201. A number of materials may be utilized as the signal carrier/transfer wire or cable. For purposes of explanation, a coaxial cable shall be utilized as an example. The coaxial cable 203 may be of a varying length depending on the desired effects, the impedance matching, and/or the requirements of the location of the water to be treated. The signal generator 201 provides the desired frequency, frequencies, and higher harmonics to the coaxial cable 203 which carries/transfers the signal to the water to be treated. Any number of signal generators 201 and signal carrier/transfer wire or cable 203 may be incorporated to achieve a desired effect.

Figure 4:
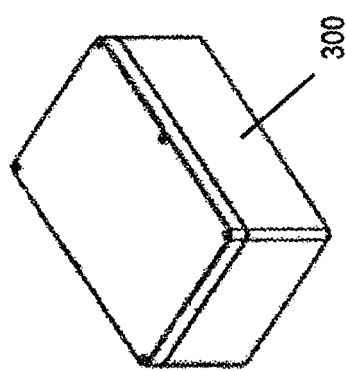

FIG. 4 illustrates a sealable NEMA type enclosure of non specific size and material 300. A sealable enclosure may be used if and when it may become necessary to install any probes utilized to deliver the carrier/transfer signal in a submerged application. The enclosure need not be completely sealed or waterproof; however, for purposes of explanation, the enclosure in the present invention is sealed and waterproof. The size and material of the NEMA enclosure may vary depending on the desired application of the present invention.

Figure 5:
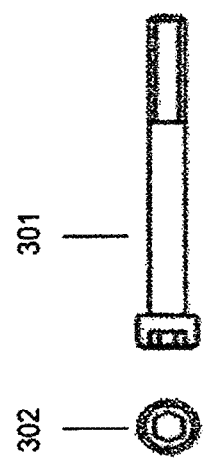

FIG. 5 illustrates an RF signal injector of non specific size and material 301. Looking at the signal injector 301 with a top down or direct view is illustrated in 302. A signal injector 301 may be used to directly deliver a desired signal to the water to be treated. The signal injector may be comprised of numerous substances, including stainless steel all thread, spark plugs, or any other desired material. For the purpose of explanation, the signal injectors in the present invention are stainless steel rods cut to a desired length, threaded on one end, and shaped to a type of point on the other end. Typically two signal injectors 301 are utilized with each signal carrier/transfer coaxial cable 203; however, more or less injectors may be used. For purpose of explanation, two signal injectors 301 are utilized with each signal generator 201 and signal carrier/transfer coaxial cable 203.

Figure 6:
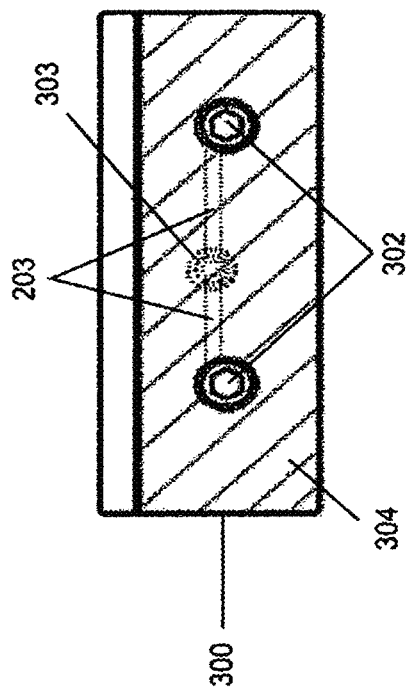

FIG. 6 illustrates NEMA enclosure 300 with the coaxial cable 203 extending inside and the signal injectors 301 protruding. A cable pass through type connector 303 may be installed in the back of the enclosure 300 to allow the coaxial cable 203 to extend inside the enclosure. The coaxial cable 203 can be diverted into two "cables" made up of the centre core and the woven metallic shield. These two cables may be connected to standard un-insulated ring terminals and may be attached to the signal injectors 301 with a standard nut. The signal injectors 302 may be installed in the enclosure 300 to allow a portion of the signal injectors 301 to protrude out of the enclosure 300. The NEMA enclosure may now be filled with a two stage potting compound 304 prior to sealing the enclosure. The signal injectors 301 may inject the carrier/transfer signal from the signal generator represented in FIG. 3 201, through the coaxial cable 203, and into the water to be treated.

Figure 7:
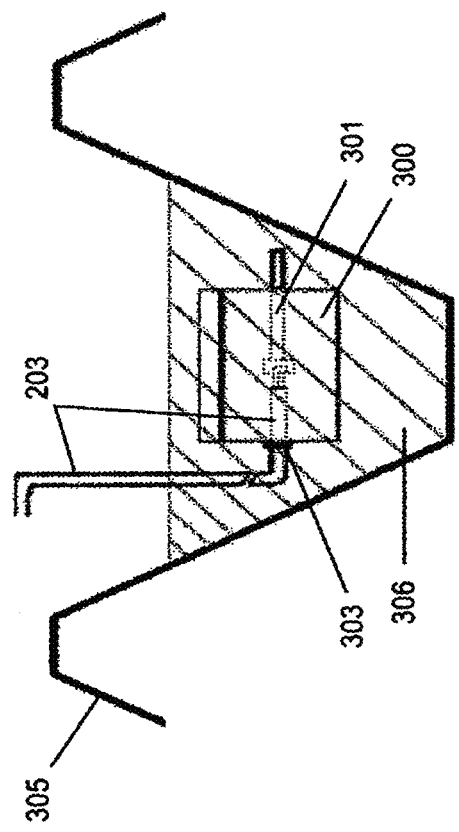

Referring to FIG. 7 which is a diagrammatic representation of a preferred method of the present invention. A preferred method illustrated in FIG. 7 would entail submerging NEMA enclosure 300 into the water to be treated 306, a signal generator, represented in FIG. 3 201, providing a desired signal chosen through the preferred method described in FIG. 1, traveling through the signal carrier/transfer coaxial cable 203, passing through the NEMA enclosure 300, which may have a potting compound, by way of a cable pass through type connector 303, connecting to signal injectors 301, which then inject the desired signal into the water to be treated 306. In this example of a preferred method, the water to be treated is an open water system. The water traveled by a furrow type delivery system 305 and may be diverted to any desired location for its intended use.

Referring to FIG. 8 which is a diagrammatic representation of a preferred method of the present invention. A preferred method illustrated in FIG. 8 may entail installing NEMA enclosure 200 in a desired proximity to the water to be treated 306, a signal generator 201 providing a desired signal chosen through the preferred method described in FIG. 1, traveling through the signal carrier/transfer coaxial cable 203, connecting to signal injectors 301 that are installed and secured in a manner that allows at least a portion of the injectors to be submerged within the water to be treated 306, the signal injectors 301 then inject the desired signal into the water to be treated 306. In this example of a preferred method, the water to be treated is a closed water system. The water traveled by a pipe type delivery system 400 and may be diverted to any desired location for its intended use.

Referring to FIG. 9 which is a diagrammatic representation of a preferred method of the present invention. A preferred method illustrated in FIG. 9 may entail installing NEMA enclosure 200 in a desired proximity to the water to be treated 306, multiple signal generators 201 providing desired signals chosen through the preferred method described in FIG. 1, traveling through the signal carrier/transfer coaxial cables 203, connecting to multiple signal injectors 301 that are installed and secured in a manner that allows at least a portion of the injectors to be submerged within the water to be treated 306, the signal injectors 301 then inject the desired signal into the water to be treated 306. In this example of a preferred method, the water to be treated is a closed water system. The water traveled by a pipe type delivery system 400 and may be diverted to any desired location for its intended use.

Referring to FIG. 10 which is a diagrammatic representation of a preferred method of the present invention. FIG. 10 is an expanded view of FIG. 9, described above, to further illustrate a preferred method to install and secure the signal injectors 301 in a manner that allows at least a portion of the injectors to be submerged within the water to be treated 306. The water traveled by a pipe type delivery system 400 and may be diverted to any desired location for its intended use.

Figure 11:
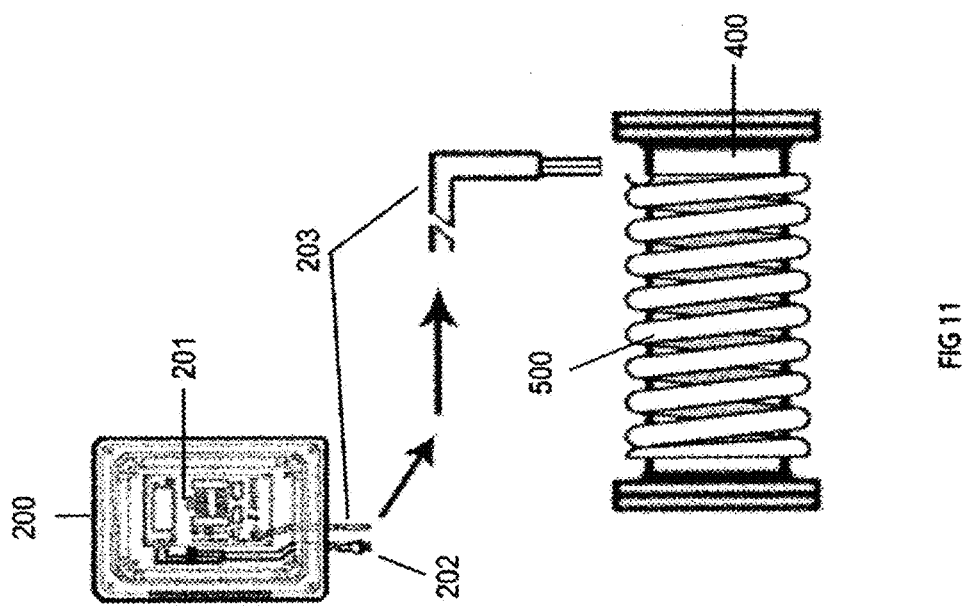
FIG. 11. is a diagrammatic representation of a preferred method of the present invention herein described below FIG. 12. is a continued illustration demonstrating a preferred method of the present invention further illustrating FIG. 11

Referring to FIG. 11 which is a diagrammatic representation of a preferred method of the present invention. A preferred method illustrated in FIG. 11 may entail installing NEMA enclosure 200 in a desired proximity to the water to be treated, a signal generator 201 providing desired signals chosen through the preferred method described in FIG. 1, traveling through the signal carrier/transfer coaxial cables 203, the signal carrier/transfer coaxial cables 203 may then be wrapped around a delivery type system 400 and/or connected to another wire/cable or any other desired material that may then be wrapped around a delivery type system 400 containing the water to be treated 306, the signal carrier/transfer coaxial cables 203 or the chosen other desired material then inject the desired signal into the water to be treated. It may not be necessary to wrap the signal carrier/transfer coaxial cables 203 around a delivery type system 400, but in the alternative be in a desired proximity of the water to be treated 306. In this example of a preferred method, the water to be treated is a closed water system at the time of treatment. The water, at least partially, traveled by a pipe type delivery system 400 and may be diverted to any desired location for its intended use.

Figure 12:
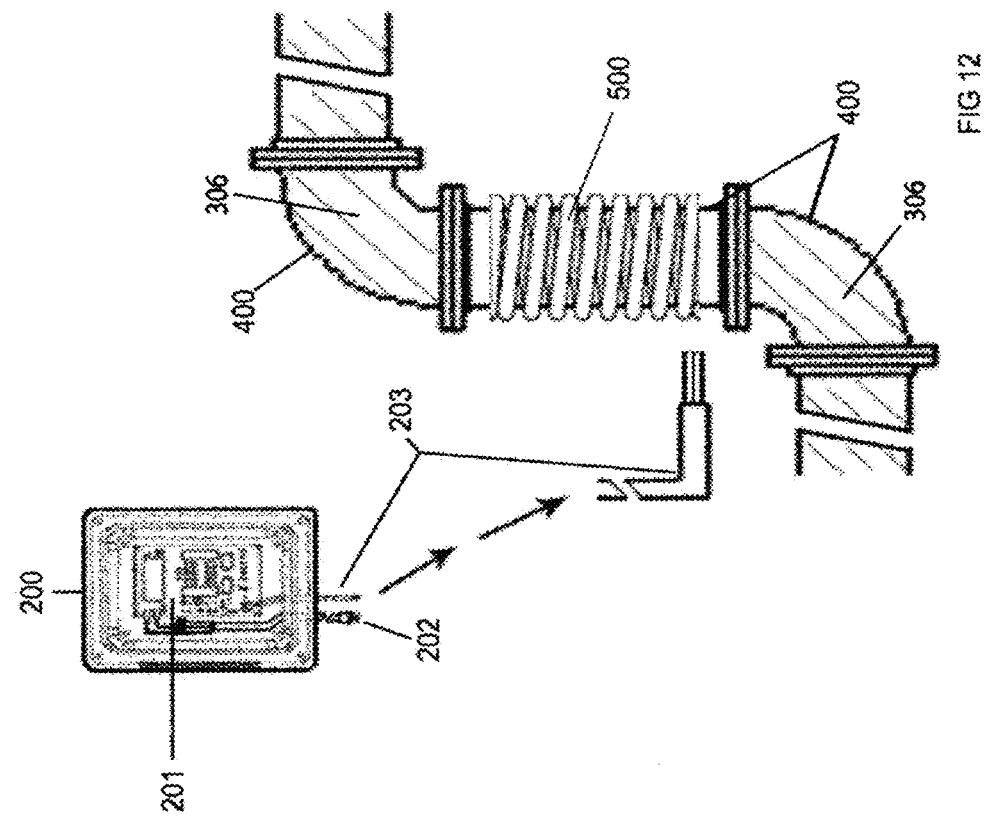

Referring to FIG. 12 which is a diagrammatic representation of a preferred method of the present invention. FIG. 12 is an expanded view of FIG. 11, described above, to further illustrate a preferred method to install and secure the signal carrier/transfer coaxial cable 203 in any desired manner in which the signal carrier/transfer coaxial cables 203 may then be wrapped around a delivery type system 400 and/or connected to another wire/cable or any other desired material that may then be wrapped around a delivery type system 400 containing the water to be treated 306. In this example of a preferred method, the water to be treated is a closed water system at the time of treatment. The water, at least partially, traveled by a pipe type delivery system 400 and may be diverted to any desired location for its intended use.

Figure 13:
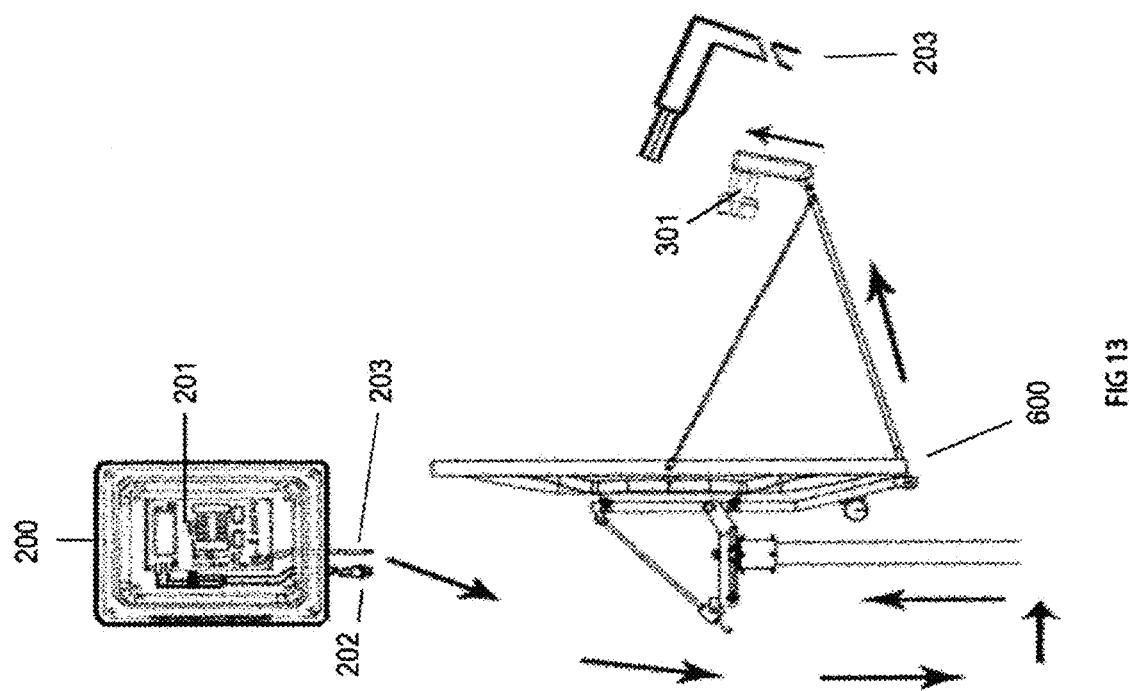
FIG. 13. is a diagrammatic representation of a preferred method of the present invention herein described below FIG. 14. is a diagrammatic representation of a preferred method of the present invention herein described below

Referring to FIG. 13 which is a diagrammatic representation of a preferred method of the present invention. A preferred method illustrated in FIG. 13 may entail installing NEMA enclosure 200 in a desired proximity to the water to be treated, a signal generator 201 providing desired signals chosen through the preferred method described in FIG. 1, traveling through the signal carrier/transfer coaxial cables 203, the signal carrier/transfer coaxial cables 203 may then travel through conduit located within or around 600 and/or connected to another wire/cable or any other desired material that may then travel in a desired manner to the transmitter located on 600 or any other desired antenna type delivery method, the signal carrier/transfer coaxial cables 203 or the chosen other desired material then directs the desired signal into the antenna to be directed in the direction chosen to treat the fluids. In this example of a preferred method, the fluid to be treated could be an open or closed type system or any other system including, but not limited to, fluid on or in the ground at the time of treatment. The fluid may later be diverted to any desired location for its intended use.

Figure 14:
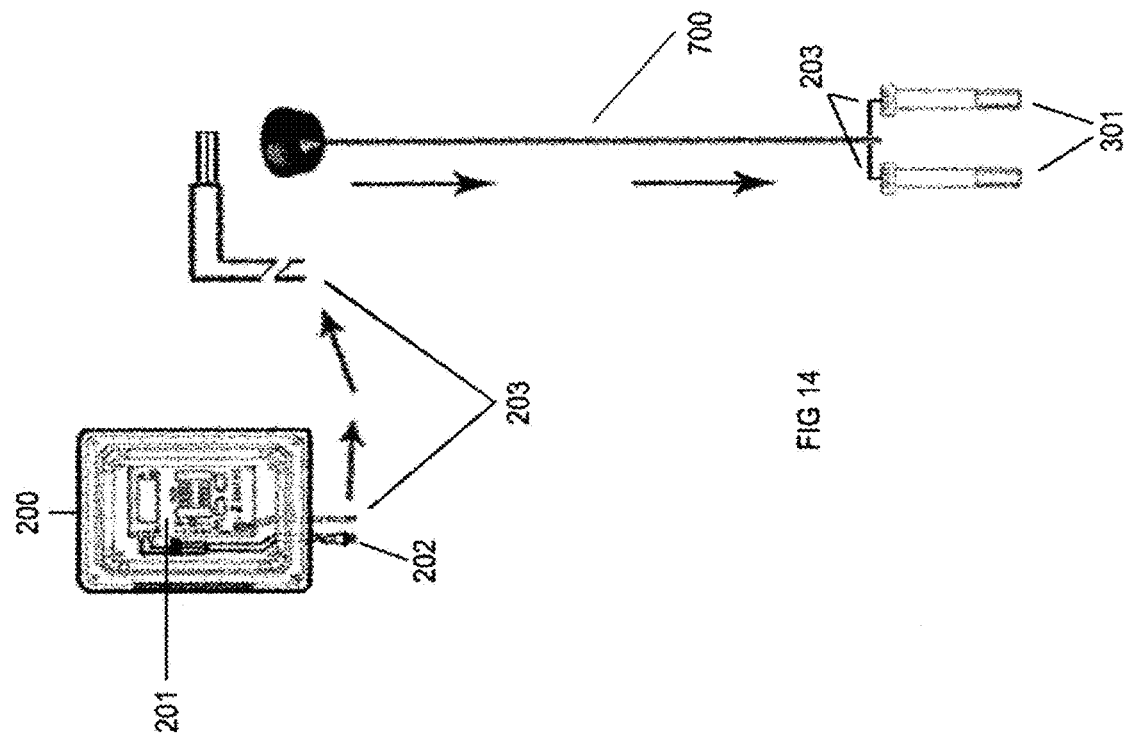

Referring to FIG. 14 which is a diagrammatic representation of a preferred method of the present invention. A preferred method illustrated in FIG. 14 may entail installing NEMA enclosure 200 in a desired proximity to the water to be treated, a signal generator 201 providing desired signals chosen through the preferred method described in FIG. 1, traveling through the signal carrier/transfer coaxial cables 203, the signal carrier/transfer coaxial cables 203 may then travel through a subterranean conduit type system 700 and/or connected to another wire/cable or any other desired material that may then travel through a subterranean delivery type system 700, the signal carrier/transfer coaxial cables 203 or the chosen other desired material then injects the desired signal into the fluid or substance to be treated. In this example of a preferred method, the water to be treated is a underground system at the time of treatment and could be an open or closed type system or any other system including, but not limited to, fluid on or in the ground. The water may later be diverted to any desired location for its intended use.

A number of experiments were performed for the purpose of assessing and demonstrating the effects of various embodiments of the present invention. The following examples are illustrative of the invention, but is not to be construed as to limiting the scope thereof in any manner.

EXAMPLE 1

Two open-topped cylindrical containers, labeled A and B, were gathered and filled with tap water. Container A was filled with tap water having been treated in a manner consistent with FIG. 8. The absorption/emission profile of the tap water was determined and the appropriate frequencies and associated higher harmonics were directed into the tap water filling container A. The tap water utilized for these tests included the critical mineral structures of Calcium, Magnesium, and Silica. These mineral structures helped determine the frequencies and associated higher harmonics to be tested. In these tests, the primary fundamental frequency of 42.7 MHz with controlled jitter and higher harmonic frequencies at 85.4 MHz and 128.1 MHz where utilized. A second fundamental frequency was chosen at 6.74 MHz with controlled jitter and higher harmonics at 13.48 MHz and 20.22 MHz where also utilized and combined into the initial fundamental frequency. Container B was filled with tap water from the same source, but without any treatment.

Varying amounts of sample fluid were removed for testing from each container, A and B, and were dispensed into small uncovered Petri dishes. An evaporation test then followed. These dishes were placed into a milligram scale (with draft shield) and allowed to evaporate over a period of time ranging between one (1) hour and fifteen (15) hours while being recorded by a camera. The recordings of the measurement of the scale in conjunction with the camera's time stamp was then used to establish the rate of evaporation of each sample.

In each tested sample from container A an increase in the evaporation rate was observed over container B. The tests were repeated for container A utilizing tap water having been treated in a manner consistent with FIG. 11, FIG. 13, and FIG. 14. Each tested sample from container A, regardless of the treatment method/manner, showed an increase in evaporation rate of tap water when compared to container B.

The above testing was repeated utilizing 95% Ethanol and Diesel Fuel. The 95% Ethanol performed consistent with tap water, albeit at an even greater increase in evaporation rate, regardless of the treatment method/manner. The Diesel fuel tested demonstrated a consistent decrease in evaporation rate, regardless of the treatment method/manner.

It is concluded that, in these experiments, treatment of container A at the determined absorption/emission profile of the fluid was effective to alter the evaporation rate in the treated fluid. In the case of tap water and 95% Ethanol, the rate of evaporation increased. In the case of Diesel Fuel, the rate of evaporation decreased.

EXAMPLE 2

Two open-topped cylindrical containers, labeled A and B, were gathered and filled with tap water. Container A was filled with tap water having been treated in a manner consistent with FIG. 8. The absorption/emission profile of the tap water was determined and the appropriate frequencies and associated higher harmonics were directed into the tap water filling container A. The tap water utilized for these tests included the critical mineral structures of Calcium, Magnesium, and Silica. These mineral structures helped determine the frequencies and associated higher harmonics to be tested. In these tests, the primary fundamental frequency of 42.7 MHz with controlled jitter and higher harmonic frequencies at 85.4 MHz and 128.1 MHz where utilized. A second fundamental frequency was chosen at 6.74 MHz with controlled jitter and higher harmonics at 13.48 MHz and 20.22 MHz where also utilized and combined into the initial fundamental frequency. Container B was filled with tap water from the same source, but without any treatment.

Varying amounts of sample fluid were removed for testing from each container, A and B, and were dispensed into small uncovered Petri dishes. A surface tension test was performed utilizing a Scientific Upward Direction Tensiometer. Appropriate fluid was used to calibrate the tensiometer before testing. Each sample group was tested and the measurements recorded.

In each sample group from container A an increase in the surface tension was observed over container B. The tests were repeated for container A utilizing tap water having been treated in a manner consistent with FIG. 11, FIG. 13, and FIG. 14. Each tested sample group from container A, regardless of the treatment method/manner, showed an increase in surface tension of tap water when compared to container B.

The above testing was repeated utilizing 95% Ethanol, Diesel Fuel, and Vegetable Oil. Each sample fluid group from container A, regardless of the treatment method/manner, demonstrated an increase in surface tension over container B.

It is concluded that, in these experiments, treatment of container A at the determined absorption/emission profile of the fluid was effective to alter the surface tension in the treated fluid.

EXAMPLE 3

Two open-topped cylindrical containers, labeled A and B, were gathered and filled with tap water. Container A was filled with tap water having been treated in a manner consistent with FIG. 8. The absorption/emission profile of the tap water was determined and the appropriate frequencies and associated higher harmonics were directed into the tap water filling container A. The tap water utilized for these tests included the critical mineral structures of Calcium, Magnesium, and Silica. These mineral structures helped determine the frequencies and associated higher harmonics to be tested. In these tests, the primary fundamental frequency of 42.7 MHz with controlled jitter and higher harmonic frequencies at 85.4 MHz and 128.1 MHz where utilized. A second fundamental frequency was chosen at 6.74 MHz with controlled jitter and higher harmonics at 13.48 MHz and 20.22 MHz where also utilized and combined into the initial fundamental frequency. Container B was filled with tap water from the same source, but without any treatment.

Varying amounts of sample fluid were removed for testing from each container, A and B, ranging from twenty (20) ml to fifty (50) ml. An Equilibrium Tube with four (4) Capillary Tubes and Support Stand was used to test capillary action of the treated container A and non treated container B. A one millimeter per square grid was developed to utilize as a backdrop to assist with visual differences in the samples capillary response. Each tube of the tested sample was measured against the grid and the results cumulated per test sample to account for any variance.

In each tested sample from container A an increase in the capillary action was observed over container B. The tests were repeated for container A utilizing tap water having been treated in a manner consistent with FIG. 11, FIG. 13, and FIG. 14. Each tested sample from container A, regardless of the treatment method/manner, showed an increase in capillary action when compared to container B.

The above testing was repeated utilizing 95% Ethanol, Diesel Fuel, and Vegetable Oil. In these tests individual capillary tubes were used in place of the Equilibrium Tube stand. Each sample fluid group from container A, regardless of the treatment method/manner, demonstrated an increase in capillary action over container B.

It is concluded that, in these experiments, treatment of container A at the determined absorption/emission profile of the fluid was effective to alter the capillary action in the treated fluid.

EXAMPLE 4

Two open-topped cylindrical containers, labeled A and B, were gathered and filled with tap water. Container A was filled with tap water having been treated in a manner consistent with FIG. 8. The absorption/emission profile of the tap water was determined and the appropriate frequencies and associated higher harmonics were directed into the tap water filling container A. The tap water utilized for these tests included the critical mineral structures of Calcium, Magnesium, and Silica. These mineral structures helped determine the frequencies and associated higher harmonics to be tested. In these tests, the primary fundamental frequency of 42.7 MHz with controlled jitter and higher harmonic frequencies at 85.4 MHz and 128.1 MHz where utilized. A second fundamental frequency was chosen at 6.74 MHz with controlled jitter and higher harmonics at 13.48 MHz and 20.22 MHz where also utilized and combined into the initial fundamental frequency. Container B was filled with tap water from the same source, but without any treatment.

Twenty five (25) ml of sample fluid were removed for testing from each container, A and B, during each test. A modified potometer test was performed. Graduated cylinders were used to test fluid uptake of Recurve Privet of the fluid from treated container A and non treated container B. Stems from the Privet were cut and placed into a graduated cylinder holding the sample fluid. Varying amounts of time were utilized ranging from thirty (30) minutes to one (1) hour prior to measuring the amount of fluid remaining in the graduated cylinder. Each stem was subjected to both treated container A and non treated container B fluid.

In each tested sample from container A an increase in the amount of fluid taken up by the Privet was observed over container B. Further, it was observed that the amount of fluid uptake decreased in samples taken from container B even after the Privet had undergone a test with fluid from container A. In testing, the Privet had a measurable amount of fluid uptake from container B that increased when fluid from container A was introduced and decreased once container B was re-introduced.

It is concluded that, in these experiments, treatment of container A at the determined absorption/emission profile of the fluid was effective to alter the amount of fluid taken up by the Privet.

EXAMPLE 5

Two open-topped cylindrical containers, labeled A and B, were gathered and filled with tap water. Container A was filled with tap water having been treated in a manner consistent with FIG. 8. The absorption/emission profile of the tap water was determined and the appropriate frequencies and associated higher harmonics were directed into the tap water filling container A. The tap water utilized for these tests included the critical mineral structures of Calcium, Magnesium, and Silica. These mineral structures helped determine the frequencies and associated higher harmonics to be tested. In these tests, the primary fundamental frequency of 42.7 MHz with controlled jitter and higher harmonic frequencies at 85.4 MHz and 128.1 MHz where utilized. A second fundamental frequency was chosen at 6.74 MHz with controlled jitter and higher harmonics at 13.48 MHz and 20.22 MHz where also utilized and combined into the initial fundamental frequency. Container B was filled with tap water from the same source, but without any treatment.

Depending on the test to be performed, varying amounts of sample fluid was removed for testing from each container, A and B, ranging from fifty (50) ml to five hundred (500) ml. Solubility tests were then performed on each sample to measure the amount of Calcium in solution. Each sample was tested with a measured amount of Garden Lime ranging between two and half (2.5) grams and seventy (70) grams. The samples were mixed for five (5) minutes. The solution then sat for varying lengths of time between five (5) minutes and thirty (30) minutes to allow for settlement of remaining solids.

In each tested sample from container A, regardless of the length of settlement time, an increased amount of Calcium was present in solution when compared to container B. The tests were repeated for container A utilizing tap water having been treated in a manner consistent with FIG. 11, FIG. 13, and FIG. 14. Each tested sample from container A, regardless of the treatment method/manner, showed an increased amount of Calcium was present in solution when compared to container B.

It is concluded that, in these experiments, treatment of container A at the determined absorption/emission profile of the fluid was effective to alter the solubility of the substance in the treated fluid.

EXAMPLE 6

Two open-topped cylindrical containers, labeled A and B, were gathered and filled with tap water. Container A was filled with tap water having been treated in a manner consistent with FIG. 8. The absorption/emission profile of the tap water was determined and the appropriate frequencies and associated higher harmonics were directed into the tap water filling container A. The tap water utilized for these tests included the critical mineral structures of Calcium, Magnesium, and Silica. These mineral structures helped determine the frequencies and associated higher harmonics to be tested. In these tests, the primary fundamental frequency of 42.7 MHz with controlled jitter and higher harmonic frequencies at 85.4 MHz and 128.1 MHz where utilized. A second fundamental frequency was chosen at 6.74 MHz with controlled jitter and higher harmonics at 13.48 MHz and 20.22 MHz where also utilized and combined into the initial fundamental frequency. Container B was filled with tap water from the same source, but without any treatment.

Varying amounts of sample fluid were removed for testing from each container, A and B, and were dispensed onto microscope slides. Tap water contained a known amount of Calcium, Magnesium, and Silica. The fluid on the slides was allowed to evaporate over a period of time. The slides were then analyzed at varying magnifications under a microscope.

In each tested sample from container A the mineral structures were observed to have an increased solubility over container B. The samples from container A were contained structures that were less globular and less crystalline with more defined lattice structures with blunted edges. The tests were repeated for container A utilizing tap water having been treated in a manner consistent with FIG. 11, FIG. 13, and FIG. 14. Each tested sample from container A, regardless of the treatment method/manner, were consistently observed to have altered mineral structures and an increased solubility when compared to container B.

The above testing was repeated utilizing a mixture of tap water with the fertilizer Triple 15 and tap water with Phosphorous. Each sample fluid group from container A, regardless of the treatment method/manner, consistently observed to have altered mineral structures and an increased solubility when compared to container B.

It is concluded that, in these experiments, treatment of container A at the determined absorption/emission profile of the fluid was effective to alter the mineral structures and relative solubility of the substances in the treated fluid.

EXAMPLE 7

Two open-topped cylindrical containers, labeled A and B, were gathered and filled with tap water. Container A was filled with tap water having been treated in a manner consistent with FIG. 8. The absorption/emission profile of the tap water was determined and the appropriate frequencies and associated higher harmonics were directed into the tap water filling container A. The tap water utilized for these tests included the critical mineral structures of Calcium, Magnesium, and Silica. These mineral structures helped determine the frequencies and associated higher harmonics to be tested. In these tests, the primary fundamental frequency of 42.7 MHz with controlled jitter and higher harmonic frequencies at 85.4 MHz and 128.1 MHz where utilized. A second fundamental frequency was chosen at 6.74 MHz with controlled jitter and higher harmonics at 13.48 MHz and 20.22 MHz where also utilized and combined into the initial fundamental frequency. Container B was filled with tap water from the same source, but without any treatment.

Varying amounts of sample fluid were removed for testing from each container, A and B, and utilized throughout the top soil samples. The goals of these tests were to quantify permeability and moisture retention of top soil samples comparing container A to container B. Various types of top soil were purchased to maintain consistent quality of the top soil samples. The top soil samples were placed into Buchner funnels and compacted using tap water and vacuum filtering. The top soil samples were then set aside to continue drying over various amounts of days.

During testing, various results were observed and recorded. Tests using top soil samples having been dried for three (3) days or more resulted in samples utilizing container A consistently demonstrating similar permeability and higher moisture retention than top soil samples utilizing container B. Tests using top soil samples having been dried for less than three (3) days resulted in samples utilizing container A consistently demonstrating higher permeability and less moisture retention than top soil samples utilizing container B.

It was observed that different top soils have varying degrees of potential moisture equilibrium which could be altered utilizing treated fluid. Depending on the type of top soil utilized and the degree to which the top soil is in need of moisture, top soil samples treated with container A either retained more moisture in the top soil or allowed better permeability to remove the fluid from the top soil.

It is concluded that, in these experiments, treatment of container A at the determined absorption/emission profile of the fluid was effective to alter the permeability and relative moisture retention of the top soil.

EXAMPLE 8

Two open-topped cylindrical containers, labeled A and B, were gathered and filled with tap water. Container A was filled with tap water having been treated in a manner consistent with FIG. 8. The absorption/emission profile of the tap water was determined and the appropriate frequencies and associated higher harmonics were directed into the tap water filling container A. The tap water utilized for these tests included the critical mineral structures of Calcium, Magnesium, and Silica. These mineral structures helped determine the frequencies and associated higher harmonics to be tested. In these tests, the primary fundamental frequency of 42.7 MHz with controlled jitter and higher harmonic frequencies at 85.4 MHz and 128.1 MHz where utilized. A second fundamental frequency was chosen at 6.74 MHz with controlled jitter and higher harmonics at 13.48 MHz and 20.22 MHz where also utilized and combined into the initial fundamental frequency. Container B was filled with tap water from the same source, but without any treatment.

Depending on the test to be performed, varying amounts of sample fluid was removed for testing from each container, A and B, ranging from two hundred (200) ml to five hundred (500) ml. A gas absorption into a fluid test was performed. Ozone gas was pumped into the samples at varying amounts of time ranging from fifteen (15) minutes and sixty (60) minutes. An Oxidation Reduction Potential (ORP) probe was utilized to measure the correlating amounts of ozone gas absorbed into the fluid.

Tap water contains Chlorine which also contributes to ORP. However, Ozone reacts with Chlorine and results in each altering the other thereby initially lowering ORP. During testing, various results were observed and recorded. It was observed that samples from container A initially reduced in ORP at a higher rate when compared to container B. Said samples from container A then increased in ORP at a higher rate when compared to container B. Said samples from container A maintained a higher ORP when compared to container B once the samples were set aside for observation over a period of time.

It is concluded that, in these experiments, treatment of container A at the determined absorption/emission profile of the fluid was effective to alter the absorption of a gas into the treated fluid.

The above examples utilized fluids with known mineral properties. In particular, the tap water was utilized to maintain uniformity during the tests. If the mineral properties of the tap water had been identified as requiring other frequencies to demonstrate the desired effect, those frequencies and associated higher harmonics would have replaced or been combined with the selected frequencies and associated higher harmonics.

ALTERNATIVE EMBODIMENT EXAMPLE

As noted above, the milliammeter, spectrum analyzer or other current measuring device need not be used in situations where known or otherwise consistent conditions exist. For example, when the water origination has previously undergone the preferred method described in FIG. 1 above, or a similar method, then the desired signals are likely known to the user. Therefore, rather than incorporating measurement and adjustment devices, a pre-selected signal can be used with such systems, thereby minimizing the cost and complexity of the system. If desired, spot checking may be used to ensure that no dramatic departures from desired operational characteristics and results occur. This may be done by going through the measurement steps previously outlined, or by taking samples of the fluid being treated to a test facility to determine if significant changes have affected the absorption/emission profile.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention. For example, the inventive method and system may be used with virtually any of the devices available for treating fluids with electromagnetic energy. Although the experiments described herein routinely employed a simple probe as a means of directing the desired electromagnetic frequency into the fluid, many other means of directing such energy into the fluid may be utilized in conjunction with or in lieu of the method and system of the present invention. Accordingly, it is intended to include all such changes, modifications and applications insofar as they come within the scope of the claims or the equivalents thereof.

What is claimed is:

1. An electromagnetic treatment method, said method comprising the steps of:
   a. generating electromagnetic signals of desired treatment frequency or frequencies, in a manner that employs associated higher harmonics of one or more of the desired frequency or frequencies by not inhibiting associated higher harmonics;
   b. directing said desired electromagnetic signals into a fluid and/or substance.

2. The method of claim 1 wherein:
   a. The electromagnetic signal has a frequency or frequencies between 0.01 KHz and 1000 MHz.
   b. said signal is intermittently and/or continuously directed into said fluid and/or substance.
   c. said signal is directed into a fluid and/or substance through direct and/or indirect contact with said fluid and/or substance.

3. The method of claim 2 wherein said treatment is used to alter a fluid and/or substance.

4. The method of claim 2 wherein said treatment is used to alter the evaporation rate of a fluid.

5. The method of claim 2 wherein said treatment is used to alter the surface tension of a fluid.

6. The method of claim 2 wherein said treatment is used to alter the capillary action of a fluid.

7. The method of claim 2 wherein said treatment is used to alter the solubility of a substance or substances located in or introduced into a fluid.

8. The method of claim 2 wherein said treatment is used to alter the absorption of a fluid and/or substance.

9. The method of claim 2 wherein said treatment is used to alter the moisture content of a substance.

10. The method of claim 2 wherein said treatment is used to alter the permeability of a fluid and/or substance.

11. The method of claim 2 wherein said treatment is used to alter the absorption of a gas into a fluid and/or substance.

12. The method of claim 2 wherein said treatment is used to alter the amount of fluid and/or chemicals used in an application.

\* \* \* \* \*